(12) United States Patent
Ye

(10) Patent No.: US 10,611,430 B2
(45) Date of Patent: Apr. 7, 2020

(54) CRANK DEVICE AND DRIVING ASSEMBLY FOR BICYCLE

(71) Applicant: De Jin Ye, Taipei (TW)

(72) Inventor: De Jin Ye, Taipei (TW)

( * ) Notice: Subject to any disclaimer, the term of this patent is extended or adjusted under 35 U.S.C. 154(b) by 0 days.

(21) Appl. No.: 16/408,499

(22) Filed: May 10, 2019

(65) Prior Publication Data

US 2019/0351970 A1   Nov. 21, 2019

(30) Foreign Application Priority Data

May 18, 2018   (TW) .............................. 107116909 A

(51) Int. Cl.
  *B62M 1/36* (2013.01)
  *F16H 21/14* (2006.01)
  *B62M 3/00* (2006.01)

(52) U.S. Cl.
  CPC ............... *B62M 1/36* (2013.01); *B62M 3/00* (2013.01); *F16H 21/14* (2013.01)

(58) Field of Classification Search
  CPC . B62M 1/36; B62M 1/38; B62M 3/00; B62M 3/003; B62M 3/06; B62M 2003/006; B62M 2009/002; B62M 9/08; F16H 21/14; B62K 19/34; A63B 2022/0617; A63B 2022/0611
  See application file for complete search history.

(56) References Cited

U.S. PATENT DOCUMENTS

| 3,954,282 | A | 5/1976 | Hege | |
| 5,172,926 | A | 12/1992 | Mannino | |
| 5,911,792 | A * | 6/1999 | Jaimes | B62M 1/10 74/594.1 |
| 6,053,520 | A * | 4/2000 | Wu | B62M 3/00 280/217 |
| 6,367,352 | B1 | 4/2002 | Niculescu | |
| 2018/0362113 | A1* | 12/2018 | Day | B62M 1/36 |
| 2019/0225300 | A1* | 7/2019 | Sprote | B62M 1/36 |

FOREIGN PATENT DOCUMENTS

| TW | M 281887 U | 12/2005 |
| TW | 2017-31726 A | 9/2017 |

* cited by examiner

*Primary Examiner* — Richard W Ridley
*Assistant Examiner* — Brian J McGovern
(74) *Attorney, Agent, or Firm* — Bacon & Thomas, PLLC

(57) ABSTRACT

In order to solve low strength and labor-saving of transmission mechanism of conventional crank assembly for a bicycle, this invention provides a crank device. The crank device of this invention includes: a housing (3) to be connected to a frame of the bicycle; a transmission member (4) accommodated in the housing (3) in a loose-fit manner; a supporting shaft (5) partially accommodated in the transmission member (4) in a loose-fit manner; and two driving assemblies (8, 9). Each of the driving assemblies (8, 9) includes: a driving member (82, 92) secured to transmission member (4) and to be connected to a sprocket of the bicycle, wherein one end of the supporting shaft (5) passes through the transmission member (4) and the driving member (82, 92) in a loose-fit manner; and a force arm (81, 91) including an ear (811) secured to the driving member (82, 92) and a bump (812) pivoted to the one end of the supporting shaft (5). This invention allows the crank device to transmit a large force and enhance labor-saving effect.

18 Claims, 6 Drawing Sheets

CRANK DEVICE AND DRIVING ASSEMBLY FOR BICYCLE

FIELD OF THE PRESENT INVENTION

This invention generally relates to a crank device and a driving assembly for a bicycle, and more particularly to a crank device and a driving assembly in which a force arm does not pass through the center of a sprocket and/or does not drive a supporting shaft.

BACKGROUND OF THE PRESENT INVENTION

As shown in FIG. 1, a conventional crank assembly 1 for a bicycle comprises a first crank arm 11, a sprocket 12 fixed to the first crank arm 11, a crank shaft 13 one end of which is connected to the first crank arm 11, a second crank arm 14 connected to another end of the crank shaft 13. A plurality of splines are formed on an outer peripheral surface at two ends of the crank shaft 13. One end, connected to the crank shaft 13, of each of the first crank arm 11 and the second crank arm 14 is formed with a splined bore 15. Two ends of the crank shaft 13 are respectively received in the splined bores 15 of the first crank arm 11 and the second crank arm 14 such that the splines of the crank shaft 13 engage with the splined bores 15 of the first crank arm 11 and the second crank arm 14.

Due to the engagement, the second crank arm 14 can rotate the crank shaft 13 via the splines on one end of the crank shaft 13 and the crank shaft 13 can rotate the sprocket 12 via the splines on another end of the crank shaft 13 when a rider of the bicycle applies a force to another end, to be connected to a pedal (not shown), of the second crank arm 14.

However, a lot of problems exist in the conventional crank assembly 1 aforementioned in which the crank shaft 13 and sprocket 12 is rotated by splines.

First, the dimensions of the splines are small and strength thereof is weak. Therefore, after the bicycle has been used for a period of time, the splines will deform or be worn such that free play occurs between the crank shaft 13 and the first crank arm 11 and the second crank arm 14. Such free play will result in incomplete transmission. Especially, a mountain bicycle encounters much obstruction when it runs on a rugged and rough terrain. At this time, the splines which are responsible for rotating the sprocket 12 and a chain will receive a large force. The large external force may cause the splines to suddenly break and lose its function of transmission. Such an accident may bring about the rider tumbling over and place the rider in a risk. In brief, the strength of the splines of the conventional crank assembly 1 is too weak so that the force can be transmitted by the splines is not large enough.

Next, both the first crank arm 11 and the second crank arm 14 are used to rotate the crank shaft 13. The length of the force arms on the first crank arm 11 and the second crank arm 14 is limited by the distance from the pedal to the crank shaft 13. The force arms on the first crank arm 11 and the second crank arm 14 cannot be increased to be longer than such a distance. In other words, the labor-saving effect cannot be uprisen.

Moreover, since one end of each of the first crank arm 11 and the second crank arm 14 is formed with a splined bore, material which surrounds the splined bore becomes thin and the strength of the one ends of the first crank arm 11 and the second crank arm 14 is decreased. Hence, the material which surrounds the splined bore is easy to crack when external forces are applied to the first crank arm 11 and the second crank arm 14.

Besides, conventional crank assembly 1 comprises too many parts, which increases the cost.

SUMMARY OF THE PRESENT INVENTION

Accordingly, this invention relates to a crank device and a driving assembly for a bicycle that are substantially intended to obviate one or more of the problems due to the limitations and disadvantages encountered in prior arts.

One object of this invention is to provide a crank device and a driving assembly for a bicycle, in which a force is not transmitted by a supporting shaft located at the center of a sprocket but by a transmission member and end faces thereof. Hence, a large force can be transmitted and a rider's safety can be ensured.

Another object of this invention is to provide a crank device and a driving assembly for a bicycle, in which a longitudinal axis of a force arm does not pass through the supporting shaft. Hence, length of the force arm can be increased to enhance labor-saving effect.

Yet another object of this invention is to provide a crank device and a driving assembly for a bicycle, in which no hole is formed on the longitudinal axis of the force arm. Hence, strength of the force arm is improved.

A further object of this invention is to provide a crank device and a driving assembly for a bicycle, which include fewer parts so as to reduce cost.

Additional features and advantages of the present invention will be set forth in the description which follows, and in portion will be apparent from the description, or may be learned by practice of the present invention. The objectives and advantages of the present invention will be realized and attained by the structure as particularly set forth in the written description and claims as well as illustrated in the appended drawings.

To achieve these and other advantages and according to the purpose of this invention, as embodied and broadly described, a crank device for a bicycle is provided. The crank device comprises: a housing to be connected to a frame of the bicycle; a transmission member accommodated in the housing in a loose-fit manner; a supporting shaft partially accommodated in the transmission member in a loose-fit manner; and two driving assemblies.

Each of the driving assemblies includes: a driving member secured to the transmission member and to be connected to a sprocket of the bicycle, wherein one end of the supporting shaft passes through the transmission member and the driving member in a loose-fit manner; and a force arm including an ear secured to the driving member and a bump pivoted to the one end of the supporting shaft; whereby when a force is applied to the force arm of any one of the driving assemblies, the force arm will be rotated about the supporting shaft and transmit the force to another driving member of another one of the driving assemblies via the ear, the driving member and the transmission member.

Moreover, one end face of the transmission member contacts and is secured to a side surface of the driving member.

It is another preferred feature that the supporting shaft is situated at a center of at least one of the transmission member, the driving member and the sprocket.

Additionally, the driving member is integrated with the sprocket to become a single part.

Furthermore, the crank device further comprises a fastener which partially snaps into the supporting shaft so as to prevent a movement of the supporting shaft along a longitudinal axis of the supporting shaft.

It is preferred that the crank device further comprises a bearing and a cap, the bearing arranged between the housing and the transmission member and the cap arranged between the bearing and the driving member respectively, so as to prevent a movement of the bearing along a longitudinal axis of the transmission member.

It is preferred that the housing includes a first shoulder which abuts against an outer race of the bearing and wherein the transmission member includes a second shoulder which abuts against an inner race of the bearing.

It is preferred that the bump extends from the force arm to a predetermined distance along a direction intersecting with a longitudinal axis of the force arm such that the supporting shaft which is pivoted at the bump is situated outside the longitudinal axis of the force arm.

It is preferred that the ear extends from the force arm to a predetermined distance along a direction intersecting with the longitudinal axis of the force arm such that the ear and the bump are respectively situated at two sides divided by the longitudinal axis of the force arm.

It is preferred that the ear extends from an end of the force arm and the bump extends from a position between two ends of the force arm.

Another aspect of this invention directs to a driving assembly for a bicycle. The driving assembly comprises: a driving member to be connected to a sprocket of a bicycle; and a force arm. The force arm includes: an ear secured to the driving member; and a bump extending from the force arm to a predetermined distance along a direction intersecting with a longitudinal axis of the force arm such that the bump is situated outside the longitudinal axis of the force arm to be pivoted at a supporting shaft of the bicycle.

Moreover, a point, which is to be pivoted to the supporting shaft, of the bump is situated at a center of the driving member and the ear is situated at an end of the force arm.

It is to be understood that both the foregoing general description and the following detailed description are exemplary and explanatory and are intended to provide a further non-limiting explanation of the present invention as claimed.

BRIEF DESCRIPTION OF THE DRAWINGS

The accompanying drawings, which are included to provide a further understanding of the present invention and constitute a portion of the specification, illustrate embodiments of the present invention and together with the description serve to explain the principle of the present invention. In the drawings.

DETAILED DESCRIPTION OF THE PRESENT INVENTION

Figure 1:
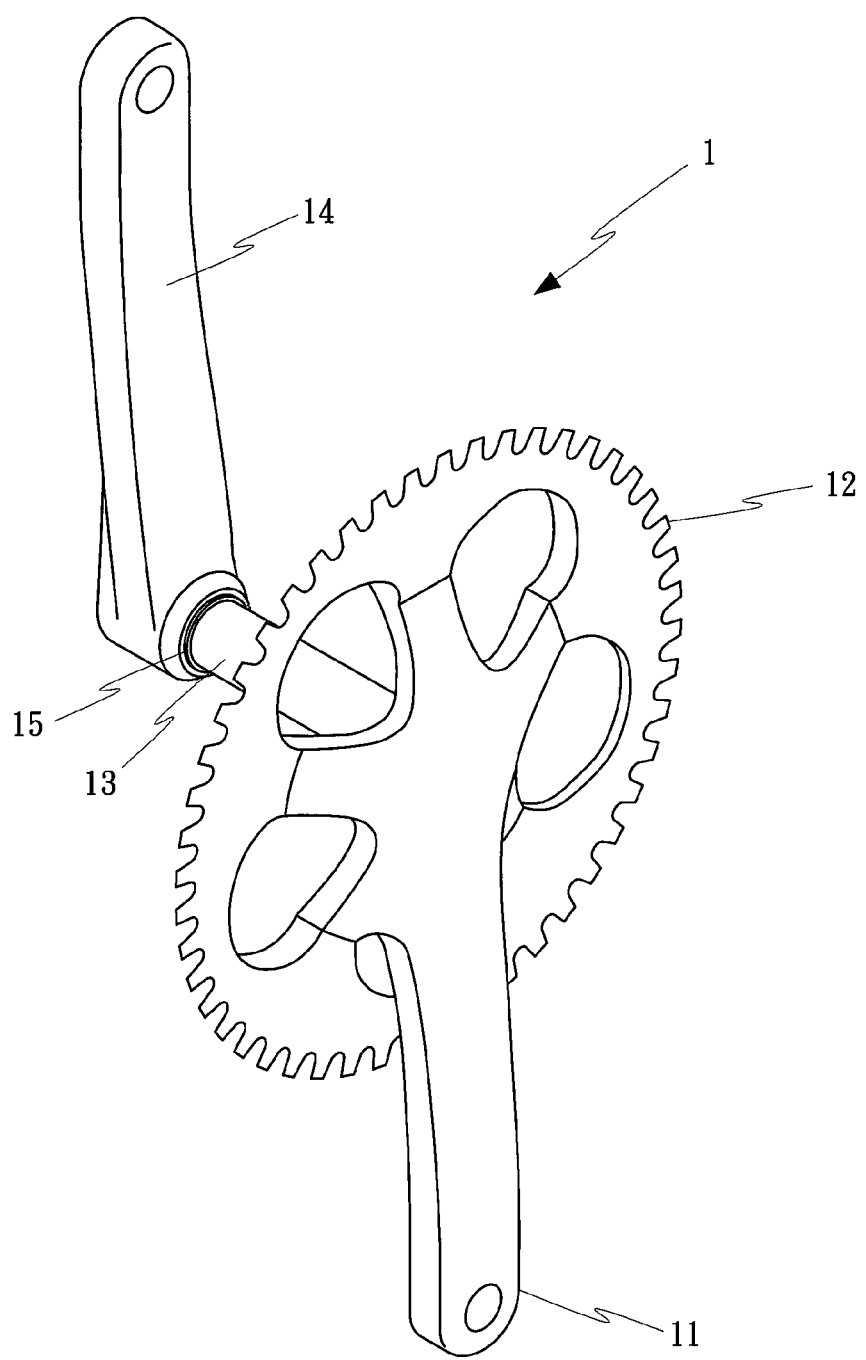
FIG. 1 is an assembled perspective view illustrating a conventional crank assembly.
Figure 2:
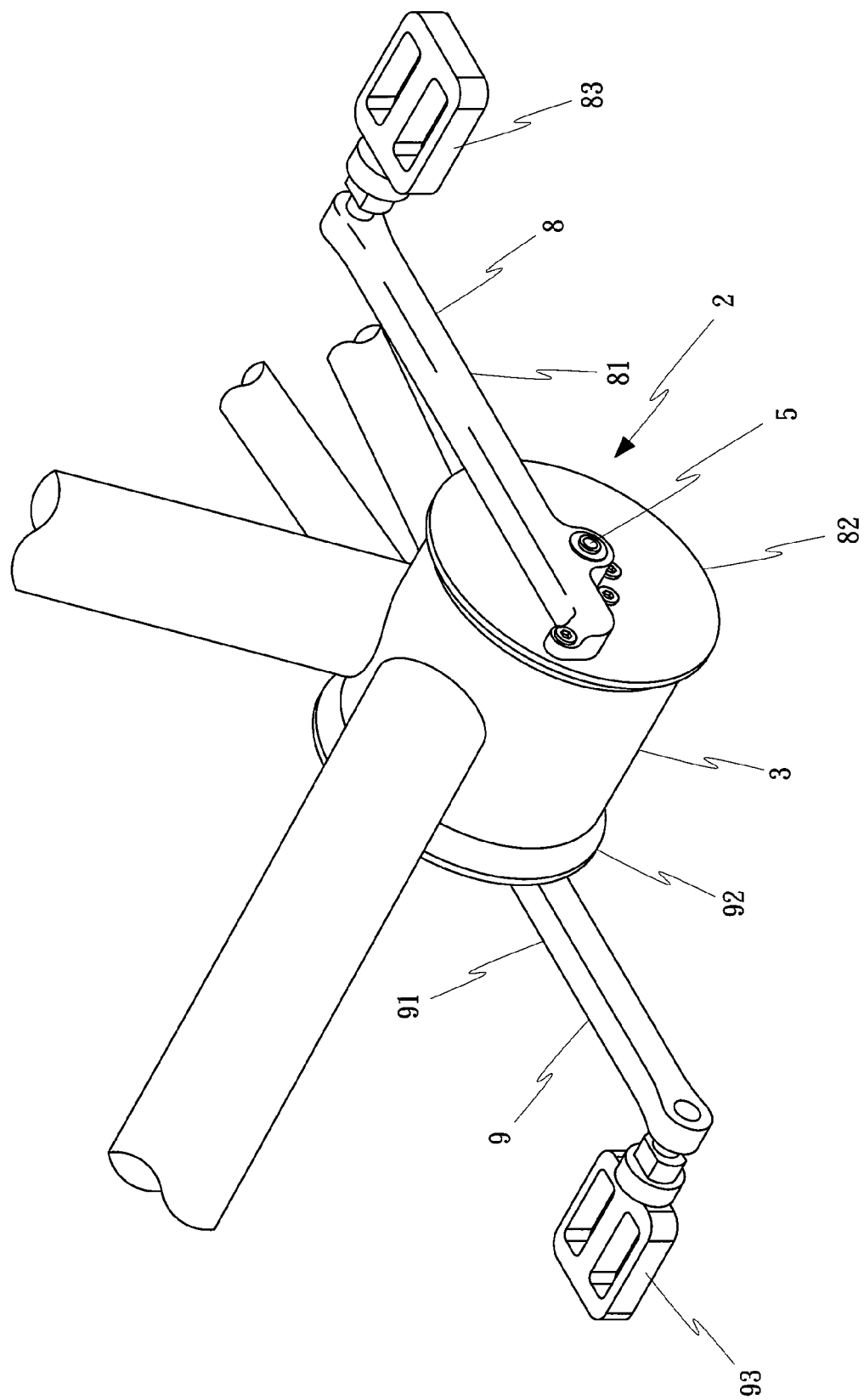
FIG. 2 is an assembled perspective view illustrating a crank device according to this invention which is mounted to a bicycle.
Figure 3:
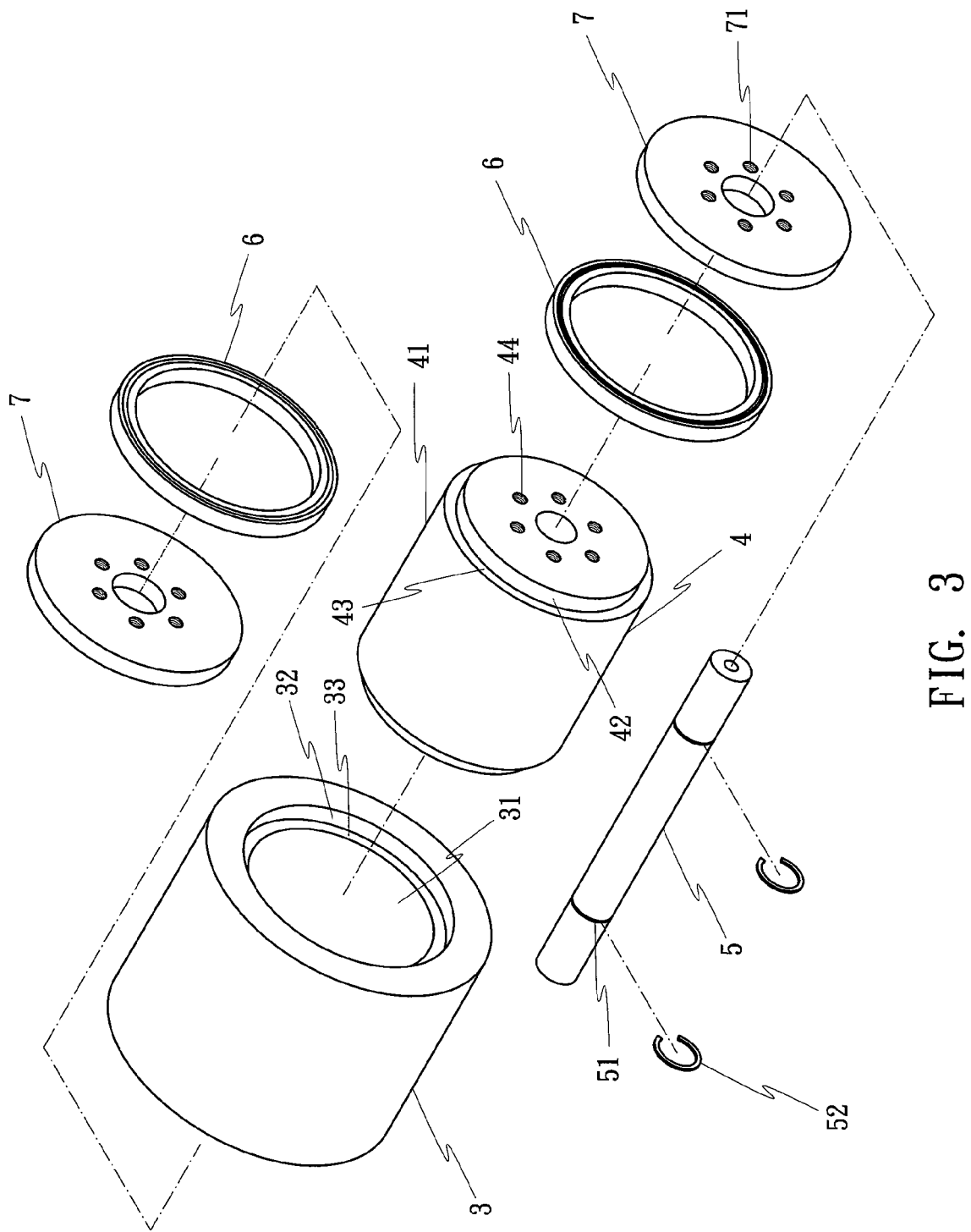
FIG. 3 is an exploded perspective view illustrating a crank device according to this invention which excludes a driving assembly.
Figure 4:
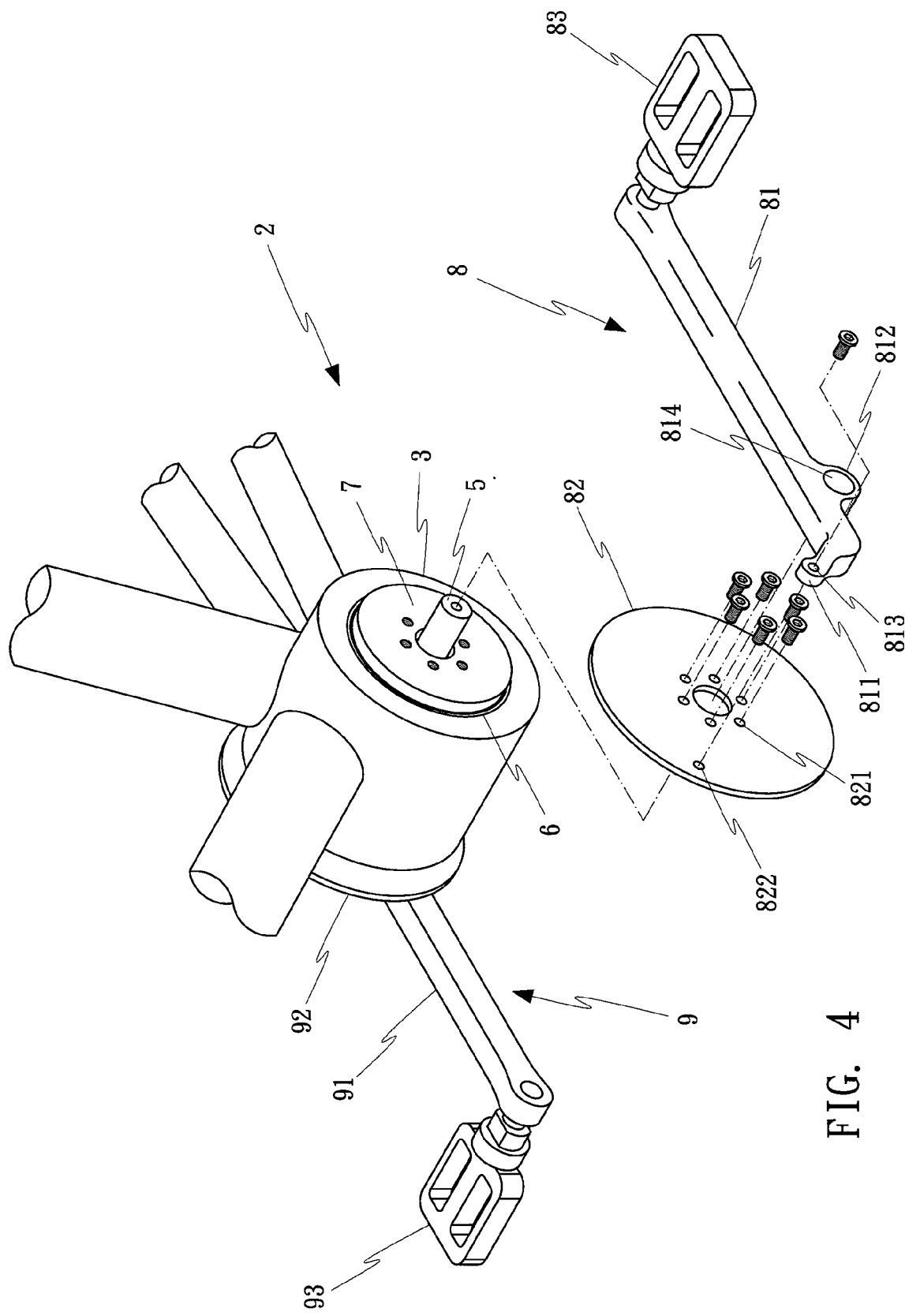
FIG. 4 a partially exploded perspective view illustrating a crank device according to this invention.

As shown in FIGS. 2, 3 and 4, a crank device 2 for a bicycle of the preferred embodiment of this invention comprises: a housing 3 for being fixed to a frame of the bicycle, a transmission member 4 mounted within the housing 3, a supporting shaft 5 received in a central hole of the transmission member 4, two bearings 6 respectively mounted at outer peripheries of two ends of the transmission member 4, two caps 7 respectively secured on two end faces of the transmission member 4, a first driving assembly 8 secured to one of the caps 7, and a second driving assembly 9 secured to another one of the caps 7.

The housing 3 may be, for example, in a form of a hollow cylinder. The inner portion of the housing 3 includes a first bore 31 having a smaller inner diameter and situated at an intermediate position, two second bores 32 having a larger inner diameter and respectively situated at two ends of housing 3, and a first shoulder 33 situated between the first bores 31 and the second bore 32.

The transmission member 4 may be, for example, in a form of a roller. The transmission member 4 includes a first section 41 having a larger outer diameter and situated at an intermediate position, two second sections 42 having a smaller outer diameter and respectively situated at two ends of the transmission member 4, two second shoulders 43 respectively situated between the first section 41 and the second sections 42, a central hole longitudinally passing through the center of the transmission member 4, and a plurality of first threaded holes 44 respectively formed on two end faces of the transmission member 4.

The supporting shaft 5 may include two grooves 51 respectively formed near two ends of the supporting shaft 5 and surrounding an outer peripheral surface of the supporting shaft 5.

The cap 7 is, for example, in a form of a disk. The cap 7 may include a central hole and a plurality of apertures 71 arranged around an outer periphery of the central hole.

The first driving assembly 8 may include a first force arm 81 in a form of a rod, a disk-shaped first driving member 82 connected to a first end of the first force arm 81 and configured to be fixed to a sprocket of the bicycle, and a first pedal 83 pivoted to a second end of the first force arm 81.

The first force arm 81 includes a first ear 811 extending a predetermined distance from the first end of the first force arm 81 in a direction intersecting with a longitudinal axis of the first force arm 81 or a lateral direction substantially perpendicular to the longitudinal axis of the first force arm 81, a first bump 812 extending a predetermined distance from a position between the first end and the second end in a direction intersecting with a longitudinal axis of the first force arm 81 or a lateral direction substantially perpendicular to the longitudinal axis of the first force arm 81, a first orifice 813 formed in the first ear 811, and a first perforation 814 formed in the first bump 812. The first ear 811 and the first bump 812 are respectively located at two opposite sides divided by the longitudinal axis of the first force arm 81.

The first driving member 82 may include a central hole formed at the center of the first driving member 82, a plurality of first eyelets 821 formed around an outer periphery of the central hole, and a second threaded hole 822 arranged near outer edge of the first driving member 82.

Mechanism of the second driving assembly 9 is similar to that of the first driving assembly 8. Difference may exist between the first driving assembly 8 and the second driving assembly 9 in that the driving member [such as the second driving member 92] of one of the first driving assembly 8 and the second driving assembly 9 is not secured to the sprocket. Hence, the second driving assembly 9 may include a second force arm 91 in a form of a rod, a second driving member 92 in a form of a disk and connected to the first end of the second force arm 91, and a second pedal 93 pivoted to the second end of the second force arm 91.

The second force arm 91 includes a second ear extending a predetermined distance from the first end of the second force arm 91 in a direction intersecting with a longitudinal axis of the second force arm 91 or a lateral direction substantially perpendicular to the longitudinal axis of the second force arm 91, a second bump extending a predetermined distance from a position between the first end and the second end in a direction intersecting with a longitudinal axis of the second force arm 91 or a lateral direction substantially perpendicular to the longitudinal axis of the second force arm 91, a second orifice formed in the second ear, and a second perforation formed in the second bump. The second ear and the second first bump are respectively located at two opposite sides divided by the longitudinal axis of the second force arm 91.

The second driving member 92 may include a central hole formed at the center of the second driving member 92, a plurality of second eyelets formed around an outer periphery of the central hole, and a third threaded hole arranged near outer edge of the second member 92.

Assembling

As shown in FIGS. 3-6, one of the bearings 6 is first mounted into the second bore 32 at one end of the housing 3. Next, the first section 41 of the transmission member 4 is mounted into the first bore 31 of the housing 3 and the second section 42 at one end of the transmission member 4 is mounted into the central hole of the bearing 6. Another bearing 6 is then mounted into a space between the second bore 32 at another end of the housing 3 and the second section 42 at another end of the transmission member 4. In this state, one side face of the outer race of each bearing 6 abuts against the first shoulder 33 of the housing 3, one side face of the inner race of each bearing 6 abuts against the second shoulder 43 of the transmission member 4, the outer peripheral surface of the outer race of each bearing 6 is a interference fit to the inner surface of the second bore 32 of the housing 3, the inner peripheral surface of the inner race of each bearing 6 is a interference fit to the outer surface of the second section 42 of the transmission member 4, and the outer surface of the first section 41 of the transmission member 4 is a loose fit to the inner surface of the first bore 31 of the housing 3.

Subsequently, the supporting shaft 5 is inserted into the central hole of the transmission member 4 in a loose-fit manner such that two grooves 51 on the supporting shaft 5 are respectively revealed outside two side faces of the transmission member 4. Two fasteners (such as c-shaped fasteners) 52 are then respectively snapped into the two grooves 51 of the supporting shaft 5. One portion of each fastener 52 is received in the groove 51 and another portion of the fastener 52 is left outside the groove 51. The portion of the fastener 52 left outside the groove 51 abuts against the end face of the transmission member 4 so as to prevent slide of the supporting shaft 5 relative to the transmission member 4 along the longitudinal axis of the transmission member 4.

Next, two caps 7 are respectively mounted at two ends of the supporting shaft 5 such that two ends of the supporting shaft 5 respectively pass through and protrude out of central holes of the two caps 7. The first driving member 82 of the first driving assembly 8 and the second driving member 92 of the second driving assembly 9 are then respectively mounted at two ends of the supporting shaft 5 such that two ends of the supporting shaft 5 respectively pass through and protrude out of central holes of the first driving member 82 and the second driving member 92. A plurality of bolts are used to respectively pass through the first eyelets 821 of the first driving member 82, the second eyelets of the second driving member 92 and the apertures 71 of the cap 7 and are finally screwed into the first threaded holes 44 on the end faces of the transmission member 4. The bolts urge the side faces of the caps 7 to abut against the ends surfaces of the transmission member 4 and the inner races of the bearings 6 so as to prevent slide of bearings 6 along the longitudinal direction of the transmission member 4.

Subsequently, the first perforation 814 of the first force arm 81 and the second perforation of the second force arm 91 respectively receive two ends of the supporting shaft 5. Two bolts are then used to respectively pass through the first orifice 813 of the first force arm 81 and the second orifice of the second force arm 91, and are finally screwed into the second threaded hole 822 of the first driving member 82 and the third threaded hole of the second driving member 92. Hence, the first force arm 81 and the second force arm 91 are respectively secured to the first driving member 82 and the second driving member 92 by the two bolts. Finally, the first pedal 83 and the second pedal 93 are respectively pivoted to the second ends of the first force arm 81 and the second force arm 91 so as to complete the assembling of the crank device 2.

Effects

The crank device 2 of this invention comprises the first driving assembly 8 and the second driving assembly 9 which are similar to each other. In order to make the description more concise, the terms "first" and "second" will be omitted and the term for a member will be directly used when the member which includes the term "first" or "second" is desired to be mentioned. For example, when the terms "the first force arm 81" or "the second force arm 91" is desired to be mentioned, the term "first" and "second" will be omitted and the term "force arm" will be directly used. In other words, when the term "force arm" is used, it may be referred to "the first force arm 81" and/or "the second force arm 91".

Because the force arms 81 and 91 of this invention are pivoted to the supporting shaft 5 by the bumps 812 and are secured to the driving members 82 and 92 by the ears 811 at the first ends of the force arms 81 and 91, the force arms 81 and 91 will be moved and rotated in a manner that the bumps 812 is rotated about and relative to the supporting shaft 5 and the driving members 82 and 92 are directly moved and rotated by the ears 811 when a rider applies forces to pedals 83 and 93 at the second ends of the force arms 81 and 91. The driving members 82 and 92 will further rotate the sprocket and chain of the bicycle without rotating or moving the supporting shaft 5 in the centers of the driving members 82 and 92 or center of the transmission member 4. In contrast, the second crank arm 14 of conventional crank assembly 1 has to move the crank shaft 13 first and the splines of the crank shaft 13 then move the sprocket 12. Hence, the crank device 2 of this invention does not have the problems that the splines are broken and worn out. The crank device 2 of this invention not only can bear larger forces but also can ensure safety for the riders.

On the other hand, side faces of the driving members 82 and 92 of this invention contact side faces of the caps 7 and side faces of the caps 7 contact end faces of the transmission member 4. A plurality of bolts pass through side faces of the driving members 82 and 92 and the caps 7 so as to firmly secure the driving members 82 and 92 and the caps 7 to the end faces of the transmission member 4. Except that frictional forces between the side faces and end faces can assist in transmission of forces applied on the pedals 83 and 93 to the transmission member 4, the large end faces of the transmission member 4 can receive a plurality of bolts with large diameters to bear forces transmitted from the driving members 82 and 89 to the caps 7 and further to the transmission member 4 because the areas of the end faces of the transmission member 4 are larger than those of the outer peripheral surface of conventional crank shaft 13. Hence, the crank device 2 of this invention not only can bear larger forces but also can ensure safety for the riders.

Furthermore, because that the force arms 81 and 91 of this invention do not move the supporting shaft 5 but directly move the driving members 82 and 92, and because that the longitudinal axes of the force arms 81 and 91 do not pass through the supporting shaft 5, length of the force arms 81 and 91 will not be limited by the supporting shaft 5. In other words, the force arms 81 and 91 can extend from the position of the pedals 83 and 93, beyond the supporting shaft 5, to the ears 811 which are located near out edges of the driving members 82 and 92. Hence, the force arms 81 and 91 of this invention are much longer than conventional crank arms 11 and 14. The long force arms 81 and 91 of this invention can greatly enhance the labor-saving effect.

Figure 5:
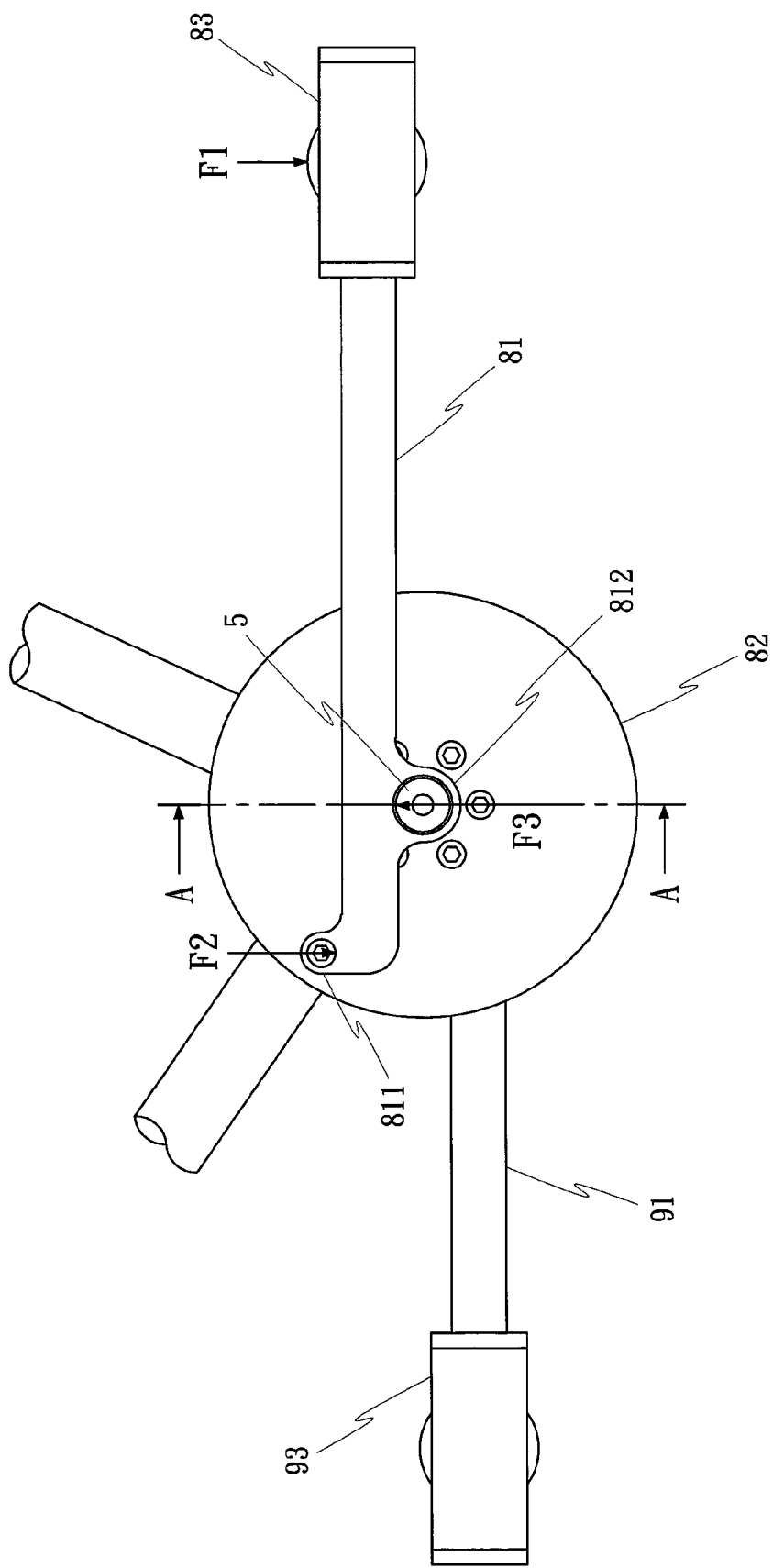
FIG. 5 an assembled front view illustrating a crank device according to this invention.
Figure 6:
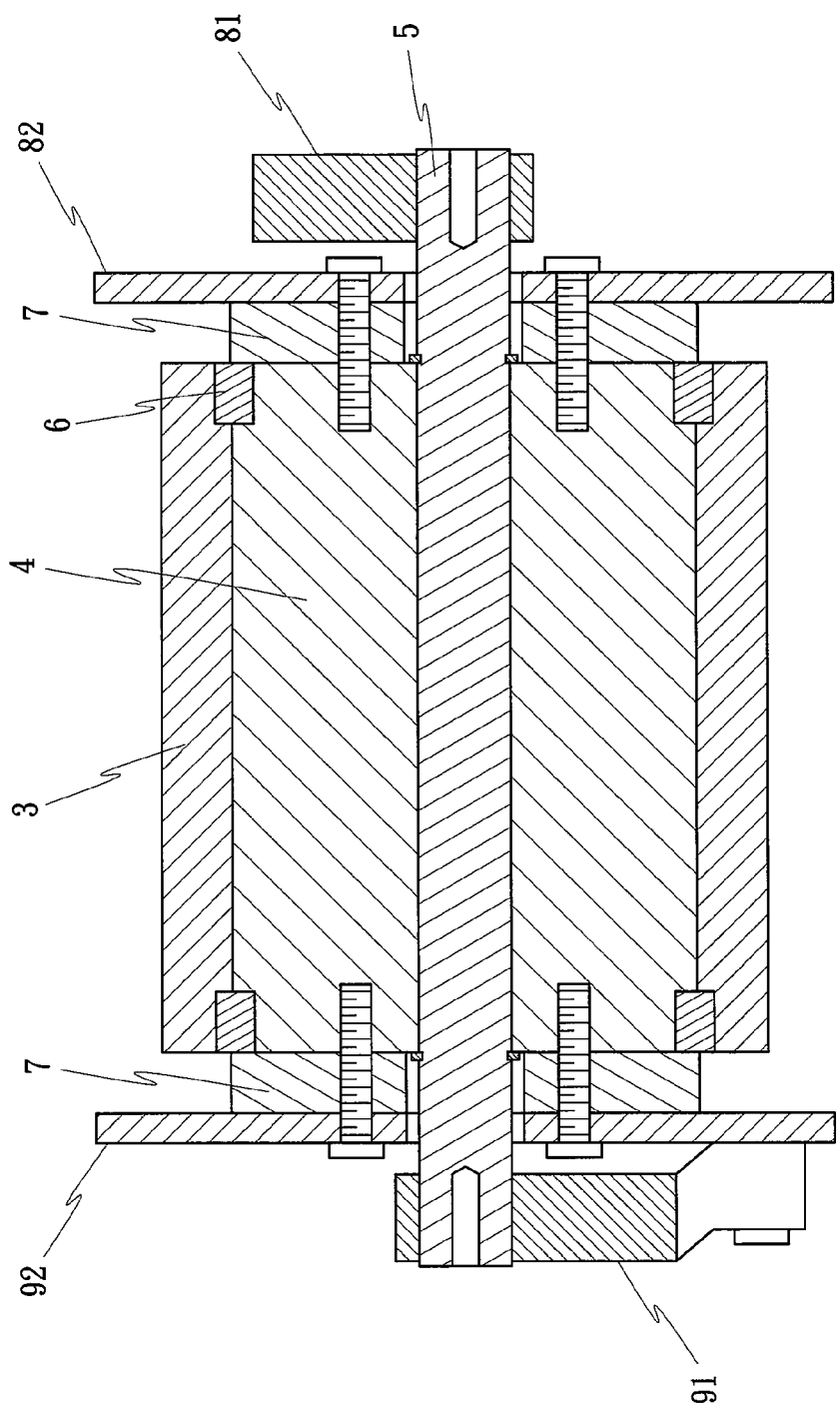
FIG. 6 is an assembled cross-sectional view taken from line A-A in FIG. 5.

Next, no hole is formed on the force arms 81 and 91 of this invention in longitudinal axes thereof. Hence, no material of the force arms 81 and 91 is cut out to decrease the width thereof, and no hole in the longitudinal axes causes stress concentration. Therefore, strength of the force arms 81 and 91 is improved. Besides, as shown in FIG. 5, the bump 812 and the ear 811 are respectively located at two sides divided by longitudinal axis of the force arm 81, the ear 811 and force F1 applied on the pedal 83 are situated in the same side, and the bump 812 and the force F1 are respectively situated in the opposite sides. Hence, when the force F1 is applied on the pedals 83 and 93, thickness of material where the eras 811 receive the first reaction force F2 from the bolt and the bumps 812 receive the second reaction force F3 from the supporting shaft 5 is equal to or larger than the entire thickness of the force arms 81 and 91. Therefore, strength of the force arms 81 and 91 is greatly enhanced. Especially, material of the force arms 81 and 91 situated at outer peripheries above the bolt and under the supporting shaft 5 does not receive any force. Hence, the material situated at the outer peripheries will not be broken. Such advantage can radically solve the problem about strength of the conventional crank arms 11 and 14.

Besides, the crank device 2 of this invention comprises fewer parts and thus can save cost.

Other Embodiments

The first driving member 82 and the second driving member 92 in aforementioned embodiment are respectively arranged on two sides of the frame of the bicycle. One of the first driving member 82 and the second driving member 92 is secured to the sprocket. However, in another embodiment, the one of the first driving member 82 and the second driving member 92 which is secured to the sprocket may be integrated with the sprocket and become a single part.

Alternatively, the caps 7 may be integrated with the driving member 82 and 92 and become a single part. In other words, the caps 7 may be integrated with the driving member 82 and 92 to become flanges on side faces of the driving member 82 and 92. The flanges may abut against end faces of the transmission member 4 and inner races of the bearings 6.

The force arms 81 and 91 may be curved or non-linear.

Alternatively, the ear 811 of each force arm 81 or 91 may be formed with two orifices 813 to allow two bolts screwing into the driving members 82.

In another embodiment, each force arm 81 or 91 may be formed with a plurality of ears 811. The ears 811 may be respectively arranged at two sides divided by longitudinal axis of force arm 81 or 91 so as to enforce the driving members 82 and 92.

The disk-shaped driving members 82 and 92 may be formed with openings or in the shape of irregular or non-circular plate so as to decrease the weight of the driving members 82 and 92. In addition, ribs may be formed on side faces of the driving members 82 and 92 so as to enforce the driving members 82 and 92.

Bolts with washers may be respectively screwed into the end faces of the supporting shaft 5. The washers may prevent the force arms 81 and 91 from sliding along longitudinal axis of the supporting shaft 5.

The diameters of the housing 3 and the transmission member 4 may be increased to accommodate more bolts or bolt with larger diameter so as to bear larger force for transmission.

This invention has been disclosed in terms of specific embodiments. It will be apparent that many modifications can be made to the disclosed structures without departing from the present invention. Therefore, it is the intent of the appended claims to cover all such variations and modifications that are within the scope of this invention.

What is claimed is:

1. A crank device (2) for a bicycle, the crank device (2) comprising:
    a housing (3) to be connected to a frame of the bicycle;
    a transmission member (4) rotatably accommodated in the housing (3);
    a supporting shaft (5) that passes through and is rotatably and partially accommodated in the transmission member (4); and
    two driving assemblies (8, 9), each of the two driving assemblies (8, 9) including:
    a driving member (82, 92) secured to the transmission member (4), wherein one end of the supporting shaft (5) passes through the driving member (82, 92); and
    a force arm (81, 91) including an ear (811) secured to the driving member (82, 92) and a bump (812) rotatably mounted to the one end of the supporting shaft (5);
    wherein one of the two driving members (82, 92) is configured to be connected to a sprocket of the bicycle;
    whereby when a force is applied to the force arm (81, 91) of a first one of the two driving assemblies (8, 9), the force arm (81, 91) will be rotated about the supporting shaft (5) and transmit the force to the driving member of a second one of the two driving assemblies via the transmission member (4).

2. The crank device (2) for a bicycle according to claim 1, wherein each of a first end face and a second end face of the transmission member (4) is secured to a respective side surface of a respective one of the driving members (82, 92) of the two driving assemblies.

3. The crank device (2) for a bicycle according to claim 2, wherein the supporting shaft (5) is situated at a center of at least one of the transmission member (4), the driving member (82, 92) of one of the two driving assemblies and the sprocket.

4. The crank device (2) for a bicycle according to claim 3, wherein in the driving member of each of the two driving assemblies, the bump (812) extends from the force arm (81, 91) to a predetermined distance along a first direction intersecting with a longitudinal axis of the force arm such that the supporting shaft (5) which is rotatably mounted at the bump (812) is situated outside the longitudinal axis of the force arm (81, 91).

5. The crank device (2) for a bicycle according to claim 4, wherein in the driving member of each of the two driving assemblies, the ear (811) extends from the force arm (81, 91) to a predetermined distance along a second direction intersecting with the longitudinal axis of the force arm such that the ear (811) and the bump (812) are respectively situated at two sides divided by the longitudinal axis of the force arm (81, 91).

6. The crank device (2) for a bicycle according to claim 5, wherein in the driving member of each of the two driving assemblies, the ear (811) extends from a first end of the force arm (81, 91) and the bump (812) extends from a position between the first end and a second end of the force arm (81, 91).

7. The crank device (2) for a bicycle according to claim 2, wherein in the driving member of each of the two driving assemblies, the bump (812) extends from the force arm (81, 91) to a predetermined distance along a first direction intersecting with a longitudinal axis of the force arm such that the supporting shaft (5) which is rotatably mounted at the bump (812) is situated outside the longitudinal axis of the force arm (81, 91).

8. The crank device (2) for a bicycle according to claim 7, wherein in the driving member of each of the two driving assemblies, the ear (811) extends from the force arm (81, 91) to a predetermined distance along a second direction intersecting with the longitudinal axis of the force arm such that the ear (811) and the bump (812) are respectively situated at two sides divided by the longitudinal axis of the force arm (81, 91).

9. The crank device (2) for a bicycle according to claim 8, wherein in the driving member of each of the two driving assemblies, the ear (811) extends from a first end of the force arm (81, 91) and the bump (812) extends from a position between the first end and a second end of the force arm (81, 91).

10. The crank device (2) for a bicycle according to claim 1, wherein the crank device (2) further comprises a fastener (52) which partially snaps into the supporting shaft (5) so as to prevent a movement of the supporting shaft along a longitudinal axis of the supporting shaft.

11. The crank device (2) for a bicycle according to claim 10, wherein the crank device (2) further comprises a bearing (6) and a cap (7), the bearing (6) is arranged between the housing (3) and the transmission member (4), and the cap (7) is arranged between the bearing (6) and one of the driving members (82, 92) so as to prevent a movement of the bearing (6) along a longitudinal axis of the transmission member (4).

12. The crank device (2) for a bicycle according to claim 11, wherein the housing (3) includes a first shoulder (33) which abuts against an outer race of the bearing (6) and wherein the transmission member (4) includes a second shoulder (43) which abuts against an inner race of the bearing (6).

13. The crank device (2) for a bicycle according to claim 1, wherein in the driving member of each of the two driving assemblies, the bump (812) extends from the force arm (81, 91) to a predetermined distance along a first direction intersecting with a longitudinal axis of the force arm such that the supporting shaft (5) which is rotatably mounted at the bump (812) is situated outside the longitudinal axis of the force arm (81, 91).

14. The crank device (2) for a bicycle according to claim 13, wherein in the driving member of each of the two driving assemblies, the ear (811) extends from the force arm (81, 91) to a predetermined distance along a second direction intersecting with the longitudinal axis of the force arm such that the ear (811) and the bump (812) are respectively situated at two sides divided by the longitudinal axis of the force arm (81, 91).

15. The crank device (2) for a bicycle according to claim 14, wherein in the driving member of each of the two driving assemblies, the ear (811) extends from a first end of the force arm (81, 91) and the bump (812) extends from a position between the first end and a second end of the force arm (81, 91).

16. The crank device (2) for a bicycle according to claim 1, wherein in the driving member of each of the two driving assemblies, the bump (812) extends from the force arm (81, 91) to a predetermined distance along a first direction intersecting with a longitudinal axis of the force arm such that the supporting shaft (5) which is rotatably mounted at the bump (812) is situated outside the longitudinal axis of the force arm (81, 91) and the bump (812) is aligned with a center of the driving member (82, 92).

17. A driving assembly (8, 9) for a bicycle, the driving assembly (8, 9) comprising:
a driving member (82, 92) to be connected to a sprocket of the bicycle; and
a force arm (81, 91) which includes:
an ear (811) secured to the driving member (82, 92); and
a bump (812) extending from the force arm (81, 91) to a predetermined distance along a first direction intersecting with a longitudinal axis of the force arm such that the bump (812) is situated outside the longitudinal axis of the force arm (81, 91) to be rotatably mounted at a supporting shaft (5) of the bicycle;
wherein the bump (812) is aligned with a center of the driving member (82, 92) and the ear (811) is situated at an end of the force arm (81, 91).

18. The driving assembly (8, 9) for a bicycle according to claim 17, wherein the ear (811) extends from the force arm (81, 91) to a predetermined distance along a second direction intersecting with the longitudinal axis of the force arm such that the ear (811) and the bump (812) are respectively situated at two sides divided by the longitudinal axis of the force arm (81, 91).

* * * * *